Patented Oct. 21, 1930

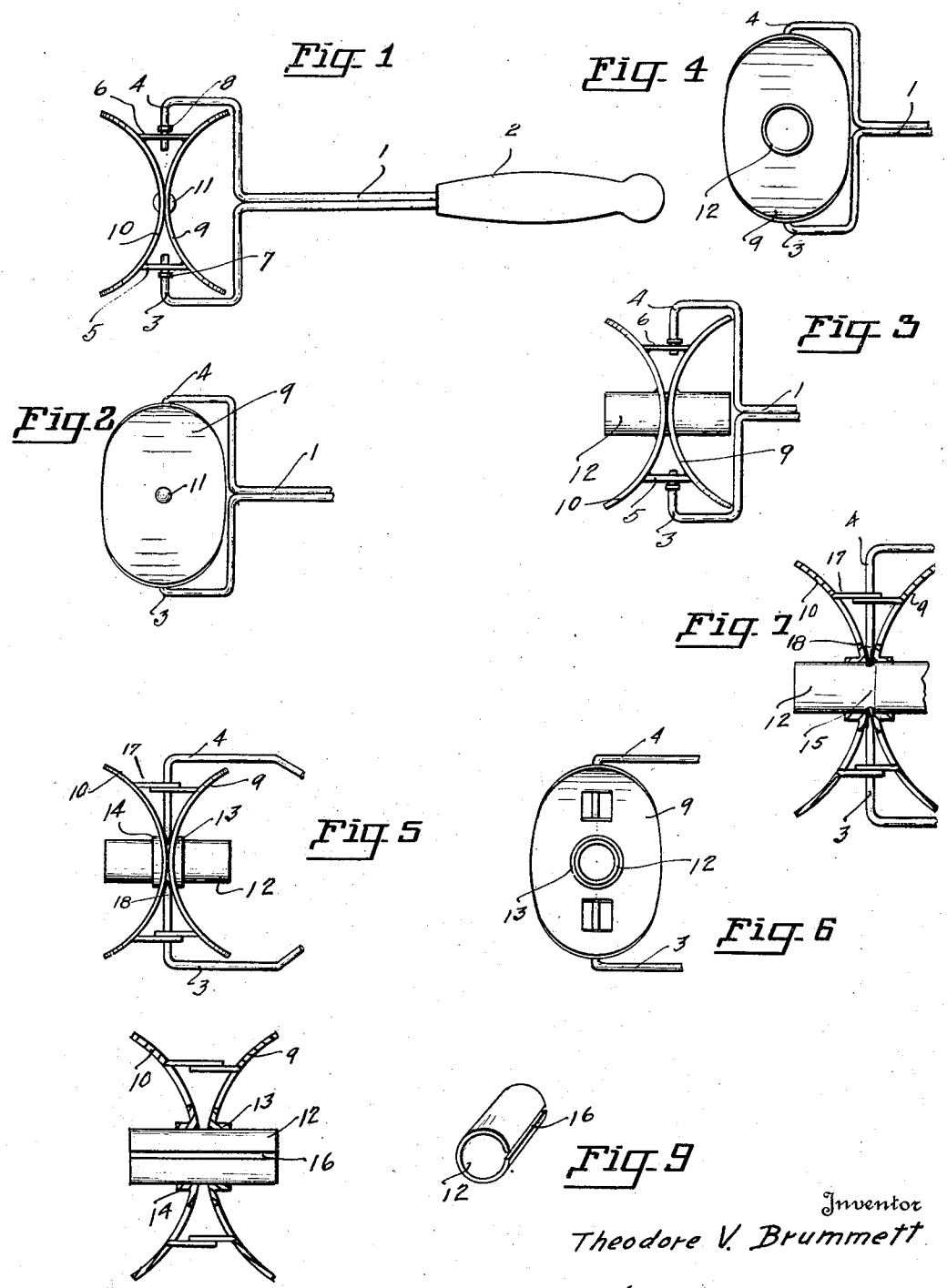

1,778,969

UNITED STATES PATENT OFFICE

THEODORE V. BRUMMETT, OF PORTLAND, OREGON

COOKY AND DOUGHNUT CUTTER

Application filed February 28, 1928. Serial No. 257,567.

A primary object of my invention is to provide a mechanism that may be used either in the cutting of doughnuts or the cutting of cookies.

A further object of my invention consists in providing a manually operated device adapted to the quantity production to either doughnuts or cookies.

A still further object of my invention consists in providing a cutter for doughnuts or cookies in quantity production that may be selectively used for either purpose. By the removal of the cylindrical center section, the device may be used for cookies, and with it in for doughnuts.

Still further objects of my invention consist in a device adapted to the quantity production of doughnuts or cookies, that is made of sheet material, of but few parts, one that will not easily get out of order, and wherein the handle elements may be utilized for the locking of the cylindrical section relative to the body portion, the removal of which transforms the doughnut cutter into a cooky cutter.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a top plan view of a form of embodiment of my device that may be used only for the production of cookies.

Fig. 2 is a fragmentary plan view of the assembly shown in Fig. 1, with the cutting blades shown in side elevation.

Fig. 3 is a fragmentary plan view of a form of embodiment of my device, wherein the same is assembled for the cutting of doughnuts.

Fig. 4 is a plan view of the mechanism illustrated in Fig. 3, with the cutting blades shown in side elevation.

Fig. 5 is a preferred form of embodiment of my device, wherein the cutter for the removal of the central portion of the doughnut, is locked in position by the handle members.

Fig. 6 is a plan view of the mechanism illustrated in Fig. 5, with the cutting blades shown in side elevation.

Fig. 7 is a fragmentary view partially broken away of the cutting blades and the central cutting section for the removal of the center of the doughnut.

Fig. 8 is a fragmentary view, partially broken away, of another embodiment of the invention.

Fig. 9 is a perspective view of the central cutting element for the removal of the center of the doughnut.

Like reference characters refer to like parts throughout the several views.

1 is the handle section, preferably made of spring wire material, to which the hand engaging member 2, is attached. The handle members 1, are spread apart their forward ends to permit of the engagement of the cutter head therein, the same being bent at right angles, as shown at 3 and 4, to engage with cross bars 5 and 6 to form a bearing thereupon. Collars 7 and 8 may be formed upon the handle members to maintain the cutter head in alignment and in position. The cutter head is preferably made of two curved blade sections 9 and 10, spaced apart at their outward ends by cross bars. The same may be secured together at their central section, as by rivets 11, shown in Fig. 1. In this form the device is to be utilized as a cooky cutter only. A central cutting element 12, may be disposed central of the cutting blades and removably secured therein so that the cutter head may be utilized for the cutting of doughnut from doughnut material. Collars 13 and 14 formed centrally of the concave side of each of the cutting blades and each has an opening therethrough in alignment with each other into which the central cylindrical cutter 12 is inserted and secured in such position by reason of the points or tips 18 of the inwardly extending ends 3 and 4 of the handle member entering a groove 15 formed centrally of the cylindrical cutter 12.

In this last and preferred embodiment of this device, instead of permanently joining the curved oval members 9 and 10 by means of the rivet 11 and the cross bars 5 and 6 these members, in the preferred form shown in Figures 5, 6 and 7 are separable. In this instance, both members 9 and 10 have cut out arms 17 adjacent their ends. The members 9 and 10 are placed each with the convex side of one against the convex side of the other, the arms 17 of the one overlapping a corresponding arm of the other. The overlapping arms 17 are provided with aligned apertures through which the inwardly turned ends 3 and 4 of the handle section 1 pass. It will be seen in this instance that the inturned handles function trebly; first, providing a pivotal connection for the cutter head; second, provide means for holding the oval cutter members 9 and 10 together; and third, they provide a simple means for retaining the tube in the position shown in Figure 5.

I preferably form the central member 12 of spring material and spaced apart its meeting edges, as illustated at 16 in Fig. 9, so that when the same is compressed and inserted in position between the collars 13 and 14 the same will have a tendency to expand and be self-locking relative to the collars.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:—

A cooky and doughnut cutter comprising a pair of concave oval shaped cutter blades having circular openings disposed centrally thereof in registerable alignment, a collar disposed about the opening and within the blade, pairs of arms rearwardly extending from the convex sides, said arms having apertures substantially near their ends in registerable alignment with each other, a tube having an annular groove formed thereon intermediate its ends being removably disposed within the collared circular openings, and a handle having inwardly turned ends extending through the apertures of the arms, said tube being held in position by the inwardly turned ends of the handle extending through the apertures within the arms and ending within the annular groove disposed within the tube.

THEODORE V. BRUMMETT.